July 22, 1958
H. H. ALLEN
2,843,937
APPARATUS FOR MEASURING AND RECORDING
THICKNESS OF PLASTIC FILM
Filed June 28, 1956
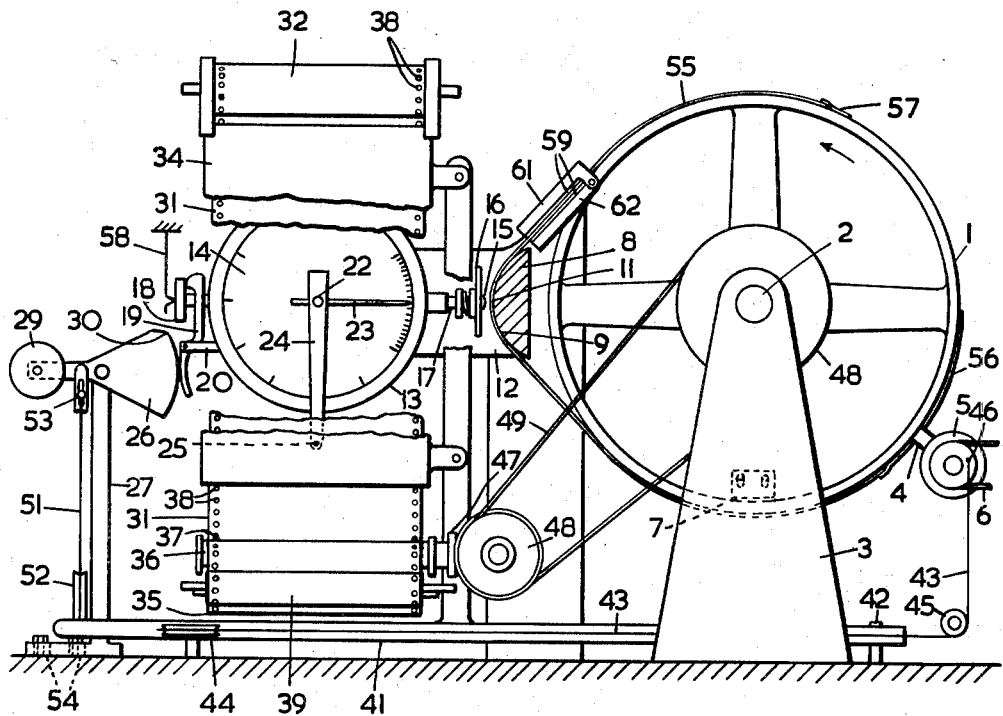

2,843,937
APPARATUS FOR MEASURING AND RECORDING THICKNESS OF PLASTIC FILM

Henry Hans Allen, London, England, assignor to British Celanese Limited, a company of Great Britain Application June 28, 1956, Serial No. 594,558

Claims priority, application Great Britain July 8, 1955

4 Claims. (Cl. 33—147)

This invention concerns a method and apparatus for measuring thickness, and particularly for measuring and recording point-to-point variations in the thickness of a sheet or strip of flexible material, for example, a plastic film, and is an improvement in or modification of the invention of U. S. A. patent application Serial No. 486,629 filed February 7, 1955.

According to the parent specification, the thickness of a sheet of flexible material is measured by a stationary thickness gauge as the distance between the movable foot of the gauge and a stationary surface (or anvil) supporting the sheet as the latter passes through the measuring gap between the foot and the anvil, the foot being urged towards the anvil so as to keep the sheet in contact with the anvil. The thickness is recorded on a strip of material which is advanced so that its motion is related to the motion of the flexible sheet. According to the preferred embodiment, the sheet is moved intermittently and the thickness is recorded at discrete points only, allowing the gauge to steady while the sheet is not moving. This avoids recording irrelevant readings which are caused by oscillations of the pointer owing to the movements and variations in thickness of the sheet. It has now been found that the thickness of the sheet may be recorded at discrete points with greater accuracy if the foot of the gauge is displaced so as to be out of contact with the sheet while the sheet is moving.

According to the present invention therefore a method of measuring and recording variations in thickness of a sheet of flexible material comprises advancing the sheet intermittently between the movable foot of a stationary thickness gauge and a stationary anvil, said gauge and anvil being secured rigidly in relation to each other, urging said foot towards said anvil in the intervals between the intermittent movements of the sheet, recording on a strip of recording material the variations in the displacement of said foot from said anvil when said foot is so urged, retracting said foot out of contact with the sheet before each intermittent movement of the sheet and advancing said strip of recording material with a motion related to the motion of the sheet. Preferably the displacement of the foot during its movement of retraction and return are not recorded. For this purpose, when the recording material is paper and the variations are recorded by a pen connected to the foot, the paper can be intermittently moved alternately towards the point of the pen for recording the variations and away from said point, the latter movement taking place before the foot is withdrawn from the sheet and the former after the foot has been urged towards the anvil and after the gauge reading has become steady. A convenient sequence operation is as follows:

(1) The sheet is stationary while the thickness is recorded, e. g. by a stylus attached to the pointer of the gauge, on a chart.

(2) The chart is withdrawn from contact with the stylus.

(3) The foot of the gauge is retracted out of contact with the sheet.

(4) The sheet is advanced so as to bring a fresh portion into the measuring gap between the foot and the anvil;

(4a) During or after (3) and (4) the chart is advanced so as to bring a fresh part to register with the stylus.

(5) The foot moves back so that it contacts the sheet when stationary.

(6) When the gauge has taken up a steady reading, the chart is moved to contact the stylus and the thickness of the sheet is recorded.

An apparatus according to the present invention for the purpose of carrying out the method defined above comprises a stationary thickness gauge having a movable foot, a stationary anvil rigidly secured in relation to said gauge, advancing mechanism for forwarding the sheet intermittently between said foot and said anvil, means for urging said foot towards said anvil, means for withdrawing said foot out of contact with said sheet before each intermittent movement of said sheet and for releasing said foot into engagement with said sheet after each intermittent movement of said sheet, advancing mechanism for forwarding a strip of recording material and means for recording on said strip variations in the displacement of said foot from said anvil when said foot is urged towards said anvil, said advancing mechanisms being geared to one another so that the movement of the sheet and the movement of the recording material are related.

The foot is preferably retracted through a distance which is not substantially greater than that required to bring it out of contact with the sheet, since the greater the movement of the foot, the longer the gauge will take to steady. For instance, it has been found satisfactory if the foot is retracted by 0.0005" more than the expected maximum variation in thickness of the sheet.

By displacing the foot of the gauge out of contact with the sheet in accordance with the present invention, the thickness of the flexible sheet or film may be recorded with a high degree of accuracy. Further, use of the present invention avoids the possibility of tearing even the thinnest film though advancing the film against the frictional resistance of the foot.

If the film is of such material as to be liable to accumulate a charge of static electricity, inaccuracies may result due to the attraction of dust particles to the film and the presence of these dust particles in the measuring gap. This source of error can be reduced by running the film past a de-electrifying device, e. g. a radioactive bar, and by removing dust particles from the neighbourhood of the measuring gap, e. g. by setting up a current of air with a fan.

By way of example, an apparatus in accordance with the invention for measuring and recording the thickness of a 2" test strip cut across the width of an extruded film is described below in greater detail with reference to the accompanying drawing, which is a diagrammatic side elevation of the apparatus, partly in section and partly broken away.

A steel drum 1, 8" diameter x 4" axial length, is supported by a horizontal spindle 2 which is rotatably mounted on supports in bearings 3. The drum 1 is driven by surface contact with a rubber eccentric 4 on a driving wheel 5, which is driven at 20 R. P. M. by a belt 6 connected to a suitable motor (not shown). A friction pad 7, which is attached to the bearing supports 3 and bears against the inner curved surface of the drum 1, brakes the drum and brings it to rest after contact between the drum 1 and eccentric 4 has ceased. The surface of the drum 1 is advanced ¼" for every rotation of the driving wheel 5, i. e. every 3 secs. For the major part of this 3 secs., the drum is at rest.

A stationary anvil 8, having a uniform cross-section and extending parallel to the axis of the drum 1, is placed a short distance from the curved surface of the drum at the level of the drum spindle 2. The side 9 of the anvil is convexly curved, except for a portion 11 which is ground to a flat 1/16" wide. The anvil 8 is rigidly supported by a member 12 which also rigidly holds a low tension dial gauge 13, reading to scale divisions of 0.0001", in such a position that the dial face 14 is vertical. The foot 15 of the gauge 13 is spring-loaded towards the flat 11 on the surface of the anvil 8, and is provided with a micrometer adjustment 16 for altering its position relative to the anvil. The stem 17 of the dial gauge, at one end of which is the foot 15, is provided at the other end with an enlarged head or button 18, by which the foot 15 may be withdrawn from the anvil 8 by hand. The button 18 can also be operated by a lever 19 which is pivoted on a bracket 20 and bears against the underside of the button 18 so as to retract the foot 15 from the anvil 8. On the dial 14 of the gauge the spindle 22 of the dial pointer 23 carries also an arm 24 which rotates with the pointer 23 and is vertical when the pointer is at zero. A recording pen 25 is mounted on this arm.

A cam 26, pivoted on a pillar 27, moves in a vertical plane and bears against the retracting lever 19 so as to retract the foot 15 from the anvil 8. On the side of the pivot remote from the cam 26 is a counterweight 29 formed integrally with the cam 26. When the counterweight 29 is allowed to rise the cam 26 falls and an inwardly sloping portion 30 of the cam surface releases the retracting lever 19, whereupon the foot 15 of the gauge is urged towards the anvil 8. When the counterweight 29 is depressed the cam 26 rises and operates the retracting lever 19 again so as to withdraw the foot 15 from the anvil 8.

A chart 31 in the form of a strip of paper passes from an upper braked supply reel 32, vertically down past the face 14 of the dial 13, over a vertical plate 34 which supports the upper supply reel 32, round a lower freely rotating reel 35 and then over a driven sprocket reel 36 carrying teeth 37 engaging in perforations 38 at either side of the paper 31, to a storage reel 39. The plate 34 and supply reel 32 are mounted on a horizontal arm 41, which is pivoted about a vertical axis at 42 and is spring loaded against the tension in a cord 43 passing through a pulley system 44, 45 to a crank 46 on the driving wheel 5 carrying the eccentric 4 which advances the drum 1. As the driving wheel 5 revolves, the cord 43 imparts to the arm 41 a periodic horizontal oscillation, which causes the chart 31 to move into and out of contact with the point of the recording pen 25. The driven sprocket reel 36 is geared through bevel gears 47, pulleys 48 and a belt 49 to the spindle 2 of the drum 1 in such a way that the chart 31 advances in steps of 1/4" each time the drum surface advances 1/4".

The arm 41 also operates the retracting lever 19 of the dial gauge 13 via the cam 26 and the counterweight 29, which is connected to the arm 41 by a second cord 51 guided by a pulley 52. The length of the cord 41 can be adjusted at 53 so that the delay between the time when the cam 26 reelases the retracting lever 19 and the time when the paper 31 contacts the recording pen 25 is sufficient to allow the gauge 13 to steady. The foot of the pillar 27 is slotted at 54 to allow adjustment of the amount by which the cam 26 retracts the foot 15 of the gauge. The angular relation between the crank 46 and the eccentric 4 on the driving wheel 5 is such that the cam 26 does not release the retracting lever 19 until the film shown at 55 is at rest.

In operation, while the foot 15 of the gauge 13 rests against the flat 11 of the anvil 8, the micrometer screw 16 is adjusted until the pointer 23 shows a negative reading equal to the nominal thickness of the film strip 55 to be tested. If the film strip is now introduced into the measuring gap between the foot 15 and the flat 11, the pointer 23 will register zero when the actual thickness is the same as the nominal thickness. Variations in the thickness of the film strip are registered by movements of the pointer from zero.

The film strip 55 is threaded through the gap between the foot 15 and the anvil 8, the driving wheel 5 being slightly advanced, if necessary, to cause the cam 26 to operate the retracting lever 19. The end of the film 55 is attached to the lower surface of the drum 1, for instance by affixing a piece of adhesive tape 56 to the film and to the surface of the drum. By using a long piece of adhesive tape 56 extending from the drum 1 to the flat 11 of the anvil 8, the film thickness can be measured from the extreme leading end of the film 55. If the film strip 55 is sufficiently short its other end may be similarly attached to the drum by an adhesive strip 57. If the film is longer, it may be supplied from a spool or may hang loose. When the film is stiff and springy, an adjustable spring 58 can be brought to bear on the button 18 attached to the stem 17 of the gauge 13 so as to ensure that the foot 15 keeps the film 55 pressed against the flat 11 of the anvil 8. The position of the cam 26 relative to the retracting lever 19 is adjusted by the slotted attachment 54 at its foot, if necessary, so that the foot 15 of the gauge is withdrawn a suitable distance from the anvil 8 whenever the retracting lever 19 is operated by the cam 26.

The film 55 on its way from the drum 1 towards the anvil 8, passes between a pair of de-electrifying pads 59 carried by hinged members 61, 62 and impregnated with a de-electrifying solution. The pads 59 not only relieve the film of any electrical charge it may have accumulated but also ensure that it reaches the measuring gap between the foot 15 and the flat 11 of anvil 8 free of dust which might obscure the accurate reading of the gauge 13.

When the apparatus has been set up, and the film 55 threaded, the driving wheel 5 is operated so as to drive the drum 1 and chart 31. As the drum 1 advances step by step the chart 31 is simultaneously advanced past the recording pen 25. With each movement of the drum 1 a fresh part of the film 55 passes into the measuring gap. Each time the film comes to rest the retracting lever 19 is released and the gauge-foot 15 contacts the film, whereupon the variation in the thickness of this fresh part of the film from the nominal thickness is registered on the dial 14. When the dial pointer 23 and pen have reached a steady reading the plate 34 brings the chart 31 momentarily into contact with the point of the pen 25. The foot 15 is then retracted from the film 55 and the drum 1 moves on again. After the whole length of the film 55 has passed through the apparatus, the driving wheel 5 is stopped and the chart 31 is removed.

Having described my invention, what I desire to secure by Letters Patent is:

1. Apparatus for measuring and recording variations in thickness of a flexible sheet material, said apparatus comprising a stationary thickness gauge having a movable foot, a stationary anvil rigidly secured in relation to said gauge, advancing mechanism for forwarding the sheet intermittently between said foot and said anvil, means for urging said foot towards said anvil, means for withdrawing said foot out of contact with said sheet before each intermittent movement of said sheet and for releasing said foot into engagement with said sheet after each intermittent movement of said sheet, advancing mechanism for forwarding a strip of recording material and means for recording on said strip variations in the displacement of said foot from said anvil when said foot is urged towards said anvil, said advancing mechanisms being geared to one another so that the movement of the sheet and the movement of the recording material are related.

2. Apparatus according to claim 1 comprising, as the means for recording on the strip of recording material, a pen for recording on a strip of paper, and means for moving said paper intermittently towards and away from the point of said pen.

3. An apparatus according to claim 2 comprising common driving means both for cyclically withdrawing and releasing the foot and for cyclically moving the paper, and connecting means from said driving means to said foot and said moving means, adapted to move the paper away from the point of the pen immediately before the foot is withdrawn.

4. An apparatus according to claim 2 comprising common driving means both for cyclically withdrawing and releasing the foot and for cyclically moving the paper, and connecting means from said driving means to said foot and said moving means, adapted to move the paper towards the point of the pen after the foot has been released and has steadied on the sheet.

References Cited in the file of this patent
UNITED STATES PATENTS

| | | |
|---|---|---|
| 549,444 | Dailey | Nov. 5, 1895 |
| 1,941,597 | Cavagnaro | Jan. 2, 1934 |
| 2,321,121 | Basquin | June 8, 1943 |
| 2,706,672 | Cooley | Apr. 19, 1955 |